(12) United States Patent
Karunakaran et al.

(10) Patent No.: US 9,223,814 B2
(45) Date of Patent: Dec. 29, 2015

(54) SCALABLE SELECTION MANAGEMENT

(75) Inventors: Rajeev V. Karunakaran, Redmond, WA (US); Rou-Peng Huang, Woodinville, WA (US); Pablo Barvo, Bothell, WA (US); Mark Xiaohong Yang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1048 days.

(21) Appl. No.: 12/275,211

(22) Filed: Nov. 20, 2008

(65) Prior Publication Data

US 2010/0125578 A1      May 20, 2010

(51) Int. Cl.
*G06F 17/30*      (2006.01)
(52) U.S. Cl.
CPC .................. *G06F 17/30312* (2013.01)
(58) Field of Classification Search
CPC ................................................ G06F 17/30312
USPC .................................................. 707/693, 754
See application file for complete search history.

(56) References Cited

U.S. PATENT DOCUMENTS

| | | | |
|---|---|---|---|
| 6,516,310 B2 | 2/2003 | Paulley | |
| 6,708,166 B1* | 3/2004 | Dysart et al. | 707/765 |
| 7,333,982 B2 | 2/2008 | Bakalash et al. | |
| 2003/0093412 A1 | 5/2003 | Urkumyan | |
| 2003/0158842 A1 | 8/2003 | Levy et al. | |
| 2006/0074872 A1* | 4/2006 | Gordon | 707/3 |
| 2006/0075007 A1* | 4/2006 | Anderson et al. | 707/206 |
| 2006/0122989 A1 | 6/2006 | Kurupati et al. | |
| 2008/0104319 A1* | 5/2008 | Hu et al. | 711/113 |
| 2008/0114779 A1* | 5/2008 | Friedlander et al. | 707/100 |
| 2008/0189251 A1 | 8/2008 | Branscome et al. | |
| 2008/0222381 A1* | 9/2008 | Lam | 711/170 |

(Continued)

FOREIGN PATENT DOCUMENTS

WO      2007134407 A1      11/2007

OTHER PUBLICATIONS

Abadi, et al., "Scalable Semantic Web Data Management using Vertical Partitioning", Proceedings of the 33rd International Conference on Very Large Data Bases, Sep. 23-28, 2007, pp. 411-422.

(Continued)

*Primary Examiner* — James Trujillo
*Assistant Examiner* — Kurt Mueller
(74) *Attorney, Agent, or Firm* — Julie Kane Akhter; Raghu Chinagudabha; Micky Minhas

(57) ABSTRACT

Architecture for handling large data selections with small and substantially constant memory footprints. The architecture facilitates the creation of sets of data objects (e.g., rows) of a data source based on selection of the data objects. The set structures can be defined according to a range (span) of data objects selected and a pattern of the objects selected. These set structures are then saved in memory, rather than the data objects, to provide optimized memory usage. In a database implementation, the solution stores the set representation (the structure) in nearly a constant amount of memory, regardless of the number of rows in the grid, and regardless of the number of rows selected. Memory usage can be proportional to the number of discontinuous spans of rows selected by the user. Structures in memory can be consolidated, replaced, or eliminated dynamically as the user changes row selections and pattern criteria.

19 Claims, 10 Drawing Sheets

(56) References Cited

U.S. PATENT DOCUMENTS

2009/0171889 A1* 7/2009 Friedlander et al. .............. 707/2
2010/0262804 A1* 10/2010 Mukherjee .................... 711/206

OTHER PUBLICATIONS

Hulten, et al., "Mining Complex Models from Arbitrarily Large Databases in Constant Time", Proceedings of the Eighth ACM SIGKDD International Conference on Knowledge Discovery and Data Mining, Poster Session: Poster papers, 2002, pp. 525-531.

Risch, et al., "High-Performance Grid Database Manager for Scientific Data", Presented at Workshop on Distributed Data & Structures—WDAS-2002, University Paris 9 Dauphine, Mar. 20-23, 2002, pp. 1-6.

Nadeau, et al., "Achieving Scalability in OLAP Materialized View Selection", Proceedings of the 5th ACM international workshop on Data Warehousing and OLAP, Nov. 8, 2002, pp. 28-34.

* cited by examiner

SCALABLE SELECTION MANAGEMENT

BACKGROUND

Large amounts of data are frequently accessed and filtered to return the desired results. This process can impact performance at least insofar as memory requirements are concerned. For example, in database applications, frequently, a query may return a large number of rows (e.g., thousands, millions). Consequently, the database application must be prepared to handle this situation as efficiently as possible. If the application does not use memory conservatively, the application may run out of memory and shutdown abnormally.

Data retrieved from the database is usually displayed in a grid. The user is able to browse the rows in the grid by dragging a scrollbar and select specific rows in order to perform an operation supported by the application, such as deleting, moving, etc. Current grid implementations require memory in proportion to the number of rows in the grid in order to manage the selection. For example, the grid may have a flag per row to remember its selection state. This leads to excessive memory usage and performance issues when the selection needs to be quickly cleared. Moreover, some implementations require memory in proportion to the number of rows selected, thereby suffering from some of the same disadvantages.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability of handling large data selection with small and substantially constant memory footprints. The architecture facilitates the creation of sets of data objects (e.g., rows) of a data source based on selection of the data objects. The set structures can be defined according to a range of data objects selected and/or a pattern of the selected data objects. These set structures are then saved in memory, rather than the data objects to provide optimized memory usage. In other words, the architecture conserves memory typically used to store the rows that have been tagged by the user by employing a representation that reduces the amount of memory used to track such rows.

In a database implementation using rows in a grid, the solution stores the set representation (the structure) in nearly a constant amount of memory, regardless of the number of rows in the grid, and regardless of the number of rows selected. Memory usage can be proportional to the number of discontinuous spans of rows selected by the user. Structures in memory can be consolidated, replaced, or eliminated dynamically as the user changes row selections and pattern criteria.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
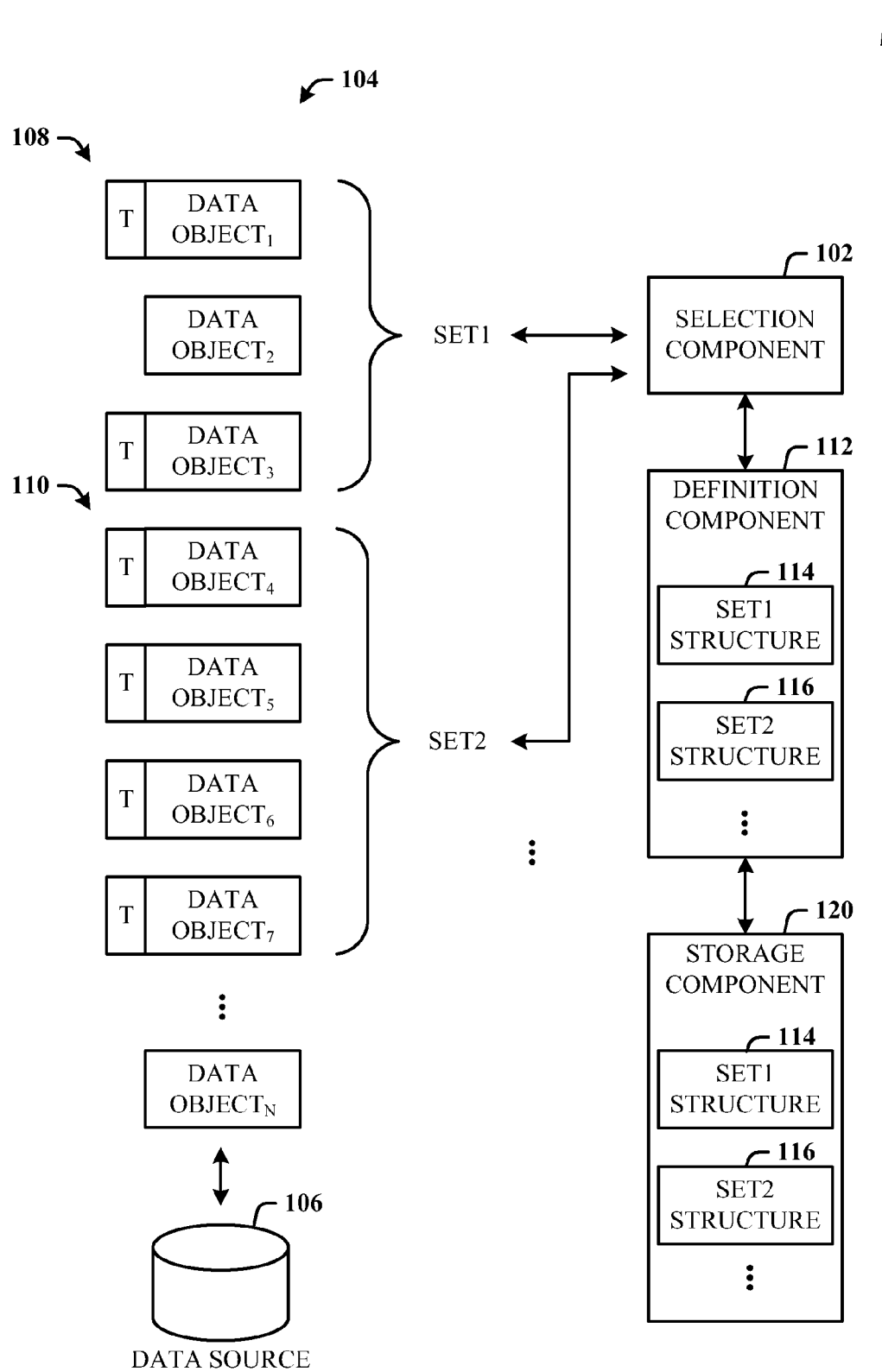
FIG. 1 illustrates a computer-implemented selection management system in accordance with the disclosed architecture.

The disclosed architecture provides an alternative way of representing large data sets in memory (e.g., client). Data sets that are selected can be represented according to a range (or span) of selected rows and/or a pattern on that range. For example, the span can range from 1 to 500 rows, and the pattern can be every fourth row in the span. Thus, in combination with or alternatively to saving every fourth row in client memory, the span information and pattern information can be stored, thereby providing the capability to handle huge data selections with small and nearly constant memory footprints. The architecture conserves the memory used to "remember" which of the rows have been tagged by the user. Moreover, as user selections change, the span can increase and the pattern selection be extended over a greater number of rows. The architecture also has applicability outside the domain of user interfaces.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented selection management system 100 in accordance with the disclosed architecture. The system 100 can include a selection component 102 for creating sets (e.g., Set1, Set2) of data objects from data objects 104 (denoted as Data Object1, . . . , Data ObjectN) of a data source 106. The selection component 102 can include a user interface (UI) that facilitates user interaction with a grid, for example, for perusing (e.g., via scrolling) a listing of the data objects, and selecting all or subsets of the data objects. For example, a first set 108 (Set1) can include three data objects and a second set 110 (Set2) can include four data objects. Thus, these sets (108 and 110) can be based on how the data objects are selected, using a tag T, or other selection mechanism, such as by a user or other entity. The tagging can be performed using a check box provided for each data object in a user interface (UI), by highlighting the data objects individually or as a group, and/or by other means for selecting. Other sets (not shown) can be created as well, based on the selection.

A definition component 112 is provided for defining structures of the sets of data objects. A structure can include range information and/or pattern information which describes the specific selection information for each set. The selection information includes a range of data objects selected and a pattern of the selected data objects in the range. For example, the range can be characterized by a starting index of a first data object and ending index of the last data object of the set. The pattern further defines object selection in the range such as the odd indexed objects, or even indexed objects, or every fourth object, and so on. Where all data objects in the range are the pattern, the pattern does not need to be specified as part of the structure information, as this can be assumed. This can further reduce the memory footprint for storing the structure information.

In this example, the selection component 102 facilitates the selection of the data objects in the first set 108 having a pattern of odd data objects (first and third), as tagged by tag T, of a span that ranges from indices 1-3. The selection component 102 facilitates the selection of all data objects of the second set 110, having a pattern of all data objects, as tagged by tag T, over a span that ranges from indices 4-7.

The definition component 112 defines a first set structure 114 for the first set 108 and a second set structure 116 for the second set 110. Each selected data object does not need to be stored, but only the representation in the form of the structure. In a simplified example, the range of the selected objects 1, 2, 3, 4, and 5 can be stored as a reduced or compressed type of representation such as objects 1-5. Other set structures can also be defined as desired.

The first set structure 114 and the second set structure 116 can then be sent to a storage component 120 for storing the structure(s), which structure(s) facilitate optimized memory usage. The memory usage is proportional to a number of discontinuous ranges of the sets of data objects selected. Thus, a worst case scenario is if the user selects every alternate object (e.g., row in a grid), which is an unlikely scenario. In real world scenarios the savings in memory usage and improvement in performance can be significant. The storage component 120 can store the set structures according to a sorted list of spans of the structures. In other words, the set structures can be stored where the sets of data objects are a sorted list of ranges, the sorted list searchable according to a binary search method.

The data objects can be rows or columns for example. In a database query implementation, the results of the query can be returned in a grid, such that a user can scroll through rows of results. The user can then tag specific ones of the rows, or ranges of rows for further review. The span and pattern information can then be stored in memory as a structure that represents the span and pattern, rather than each instance of the selected rows.

Figure 2:
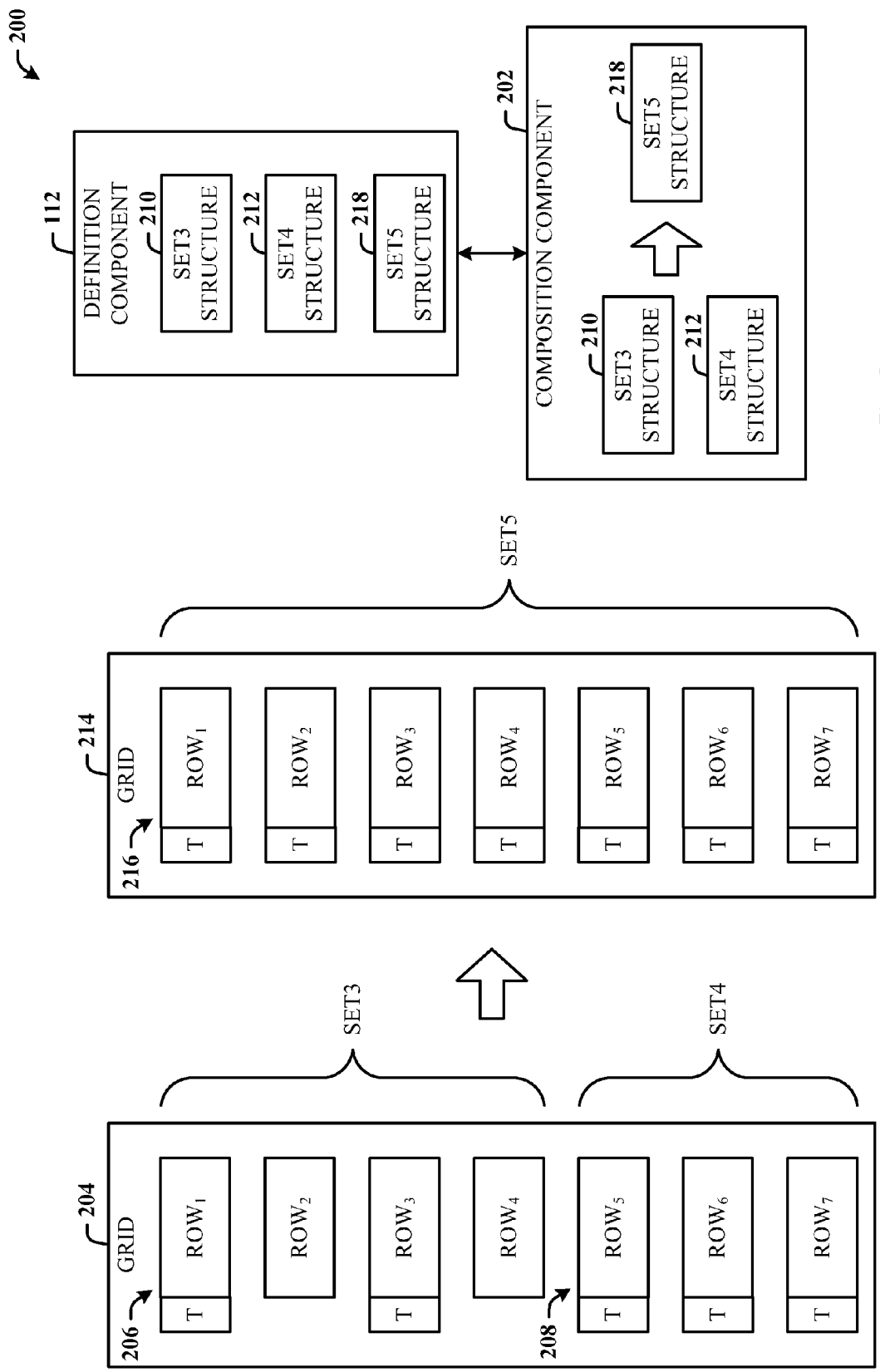
FIG. 2 illustrates a selection management system that further includes the capability of altering the composition of or eliminating the stored set structures based on changes in the sets of data objects.

FIG. 2 illustrates a selection management system 200 that further includes the capability of altering the composition of or eliminating the stored set structures based on changes in the sets of data objects. The system 200 includes a composition component 202 for changing the composition of the sets of data objects by merging discontinuous ranges into a single continuous range of data objects based on selection of a new data object.

In this example, data objects in the form of rows are returned as query results in a first grid 204 for user selection and viewing. Initially, the user has selected two set of rows: a third set 206 (as Set3) having a span that ranges over indices 1-4 for Rows 1-4, and a fourth set 208 (as Set4) having a span that ranges over indices 5-7 of Rows 5-7. The third set 206 has a pattern defined as all odd rows (or indices). The fourth span 208 has a continuous pattern defined as all rows (essentially, no pattern).

The definition component 112 then creates two set structures based on the selections as defined by the spans and patterns: a third set structure 210 is created that defines the third set 206, and a fourth structure 212 is created that defines the fourth set 208. These set structures (210 and 212) can then be stored in memory.

Sometime later, the user makes a selection change to the rows in the first grid 204 such that the selections are now depicted as shown in a second grid 214. In other words, the user further tags row 2 and row 4. This now makes one continuous span of rows (Rows 1-7) having no pattern, defined as a fifth set 216. The definition component 112 detects this change and creates a fifth set structure 218 that captures the span and pattern information for the fifth set 216.

The composition component 202 automatically processes the new set structure, the fifth set structure 218, against the other set structures (210 and 212) to attempt consolidation of the structure information in memory to reduce the memory footprint. In this example, the composition can change such that the fifth set structure 218 encapsulates the entire grid view such the third set structure 210 and fourth set structure 212 can be deleted from the memory entirely.

Figure 3:
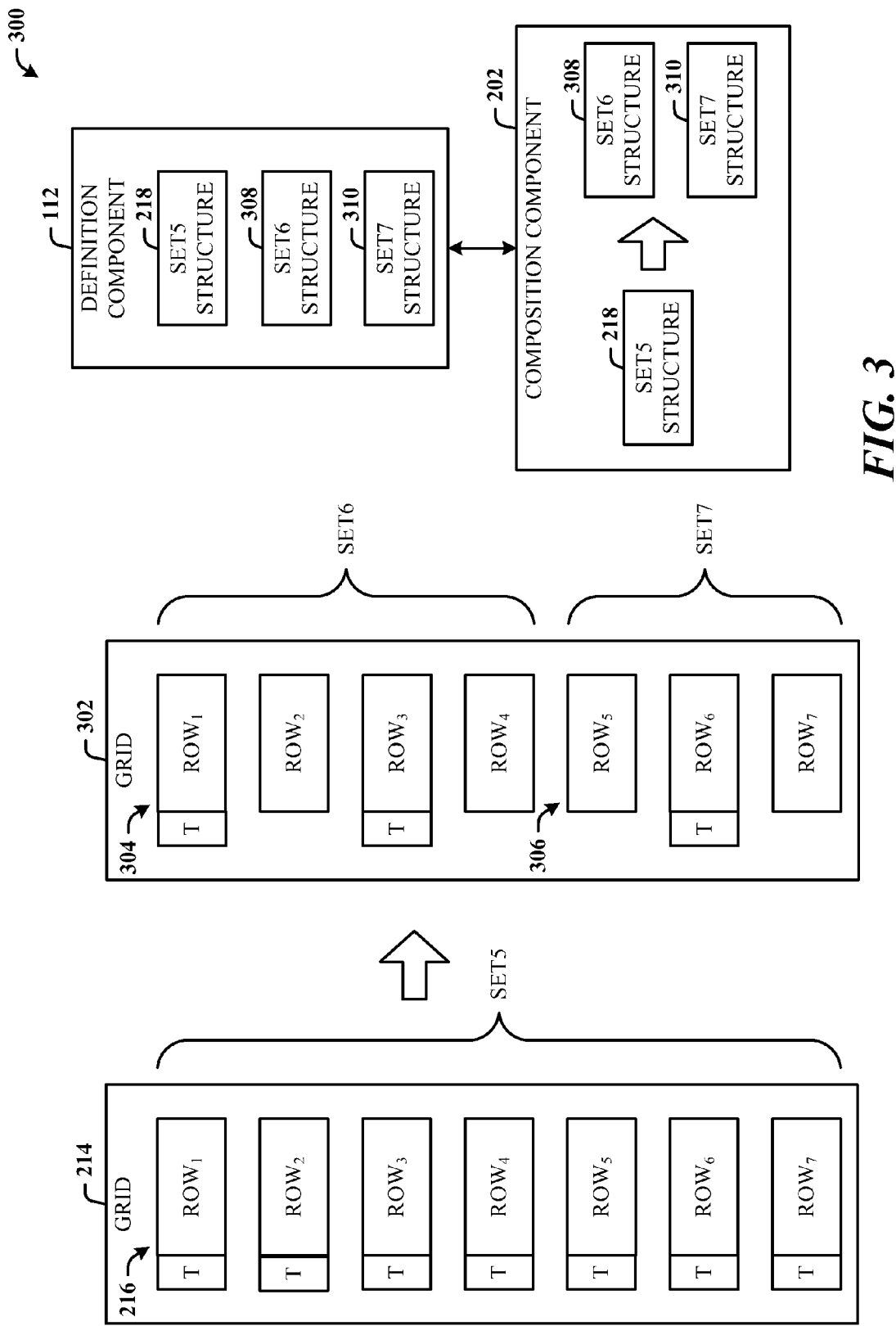
FIG. 3 illustrates a selection management system that further includes the capability of altering the composition of or eliminating stored set structures based on changes in the sets of data objects.

FIG. 3 illustrates a selection management system 300 that further includes the capability of altering the composition of or eliminating stored set structures based on changes in the sets of data objects. The composition component 202 can change composition of a first set of data objects by splitting the first set into multiple sets based on deselection of one or more rows of the first set. Continuing from the example of FIG. 2, the user operates from the second grid 214 by changing the span from a single span to two spans that define two new row sets depicted in a third grid 302: a span of four rows (Rows 1-4) that define a sixth set 304 and a span of three rows (Rows 5-7) that defines a seventh set 306. The user can configure the patterns for each set as all odd rows for the sixth set 304 and all even rows for the seventh set 306, for example.

The definition component 112 then creates two additional set structures based on the selections as defined by the spans and patterns: a sixth set structure 308 is created that defines the span and patterns of sixth set 304, and a seventh structure 310 is created that defines the span and patterns of the seventh set 306.

The composition component 202 automatically processes the new set structures (308 and 310) against the other set structures (e.g., the fifth set structure 218) to attempt consolidation of the structure information in memory to reduce the memory footprint. However, this is a split in a single row set into two row sets. In this example, the composition changes such that the fifth set structure 218 can be eliminated and the sixth set structure 308 and seventh set structure 310 are added to memory resulting in a minimal increase in the footprint in memory.

Figure 4:
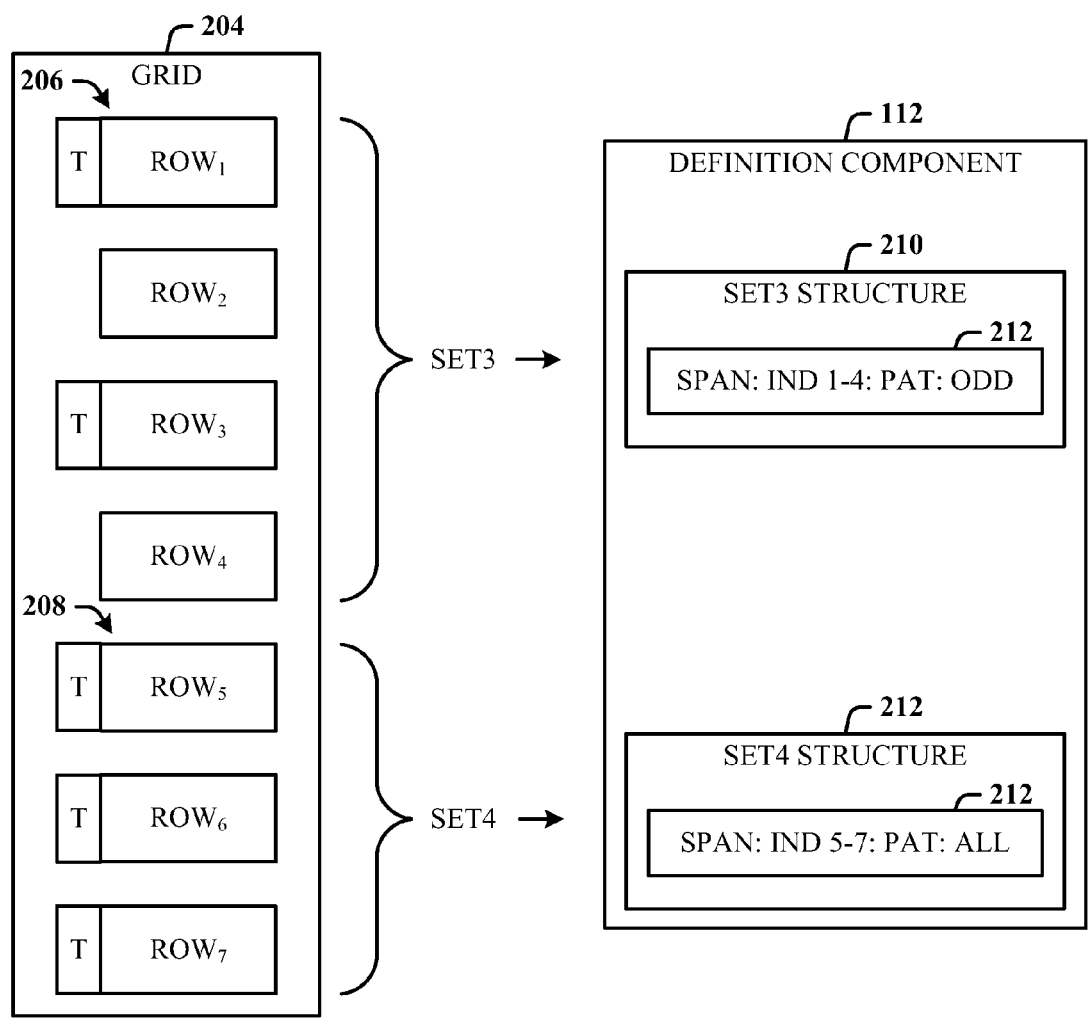
FIG. 4 illustrates exemplary set structure syntax for representing span and pattern information of a data object sets.

FIG. 4 illustrates exemplary set structure syntax for representing span and pattern information of a data object sets. Using the first grid 204 of FIG. 2, the definition component 112 can create the third set structure 210, which represents the third set 206, to include span information (SPAN) having parameters that define the span over index values (IND) such as row indices 1-4, and pattern information (PAT) that defines a pattern of row selection (e.g., ODD for all odd indexed rows).

Figure 5:
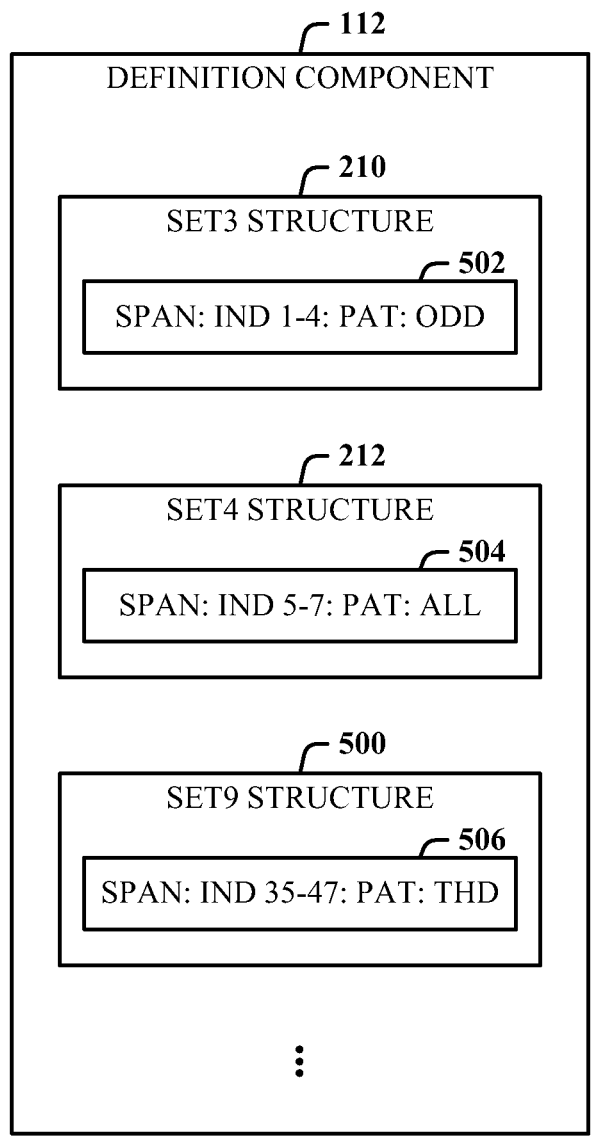
FIG. 5 illustrates that set structures can be maintained as a sorted list ranked according to span information.

FIG. 5 illustrates that set structures can be maintained as a sorted list ranked according to span information. Here, the definition component 112 sorts at least three set structures: the third set structure 210, the fourth set structure 212, and a ninth set structure 500. The third set structure 210 includes span and pattern criteria 502, the fourth set structure 212 includes span and pattern criteria 504, and the ninth set structure 500 includes span and pattern criteria 506. The sorting is a top-to-bottom listing according to the span information such that the span having indices 1-4 rank higher than the span having the indices 5-7, both of which are sorted higher than the span having the indices 35-47.

In other words, the structure stores the starting index and ending index of a range of rows. Thus, if all the rows in the grid are selected, only one span object (set structure) is needed to remember the selection. If two discontinuous ranges of rows are selected then two span objects (set structures) are needed. When additional rows are selected the algorithm checks if two previously discontinuous spans are now continuous, and if so, merges the spans. Similarly, when a row is deselected, a span may be split in two spans. New spans are added such that the list of spans is in sorted order. This makes it possible to use binary search to quickly determine if a given row is selected, and to quickly add or remove rows from the selection.

Span and pattern processing can be handled as an algorithm that is described in two parts—the selection spans that defines the structure and the selection pattern that defines the selection criteria.

The selection pattern can be added to further reduce the memory footprints, or employed instead of the span. The selection pattern is flexible and extensible to allow simple and complex patterns to be defined with the particular span (the range of the rows or data objects). Following are examples of predefined patterns that can be employed: select all the rows (basically, there is no pattern), select every even row, select every odd row, select every third row, and so on.

The selection pattern is extensible to store user specified patterns. For example, it is common in UIs to allow user to perform "finds" or "searches" within a range of rows. In this case the user specifies some search pattern via the UI. Once selected, the user-specified search pattern can be stored in one span that exactly identifies all the selected rows.

In another implementation, the computer-implemented selection management system comprises the selection component for selecting rows of results in a grid from a query of a database, the definition component for defining the selected rows as one or more structures that represent the selected rows according to span information and pattern information, and the composition component for changing composition of the one or more structures based on a change in composition of the selected rows.

The span information characterizes a structure according to a range that includes a starting index and ending index, and the pattern information characterizes a structure according to a pattern of the selected rows. The composition component changes the composition of multiple structures by merging the multiple structures into a single structure based on a new selection of one or more rows that change corresponding discontinuous row sets into a continuous row set defined by the single structure. The composition component changes the composition of a single structure into multiple structures by partitioning the single structure into the multiple structures based on a deselection of one or more rows that change. The structures are stored in memory as a searchable and sorted list based on the span information, an amount of memory which is proportional to a number of discontinuous ranges of the rows selected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
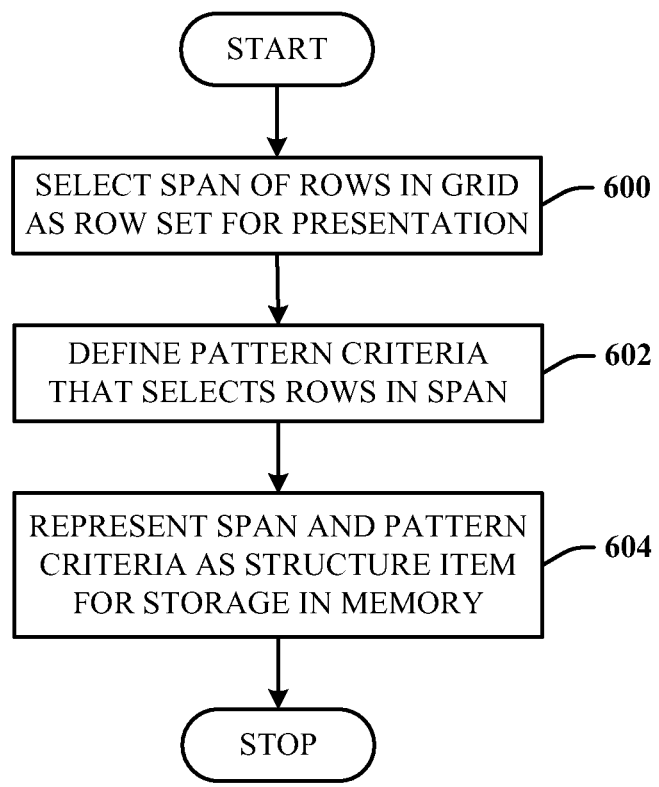
FIG. 6 illustrates a method of managing data selection.

FIG. 6 illustrates a method of managing data selection. At 600, a span of rows in a grid is selected as a row set for presentation. At 602, pattern criteria are defined that selects rows in the span. At 604, the span and the pattern criteria are represented as a structure item for storage in memory.

The pattern criteria can be user-defined search criteria that when processed returns rows matching the search criteria. The matching rows can be represented as the structure item. The method can further comprise storing structure items as a searchable and sorted list based on the span, and automatically creating multiple structure items from the structure item in response to a change in the rows selected for presentation.

Figure 7:
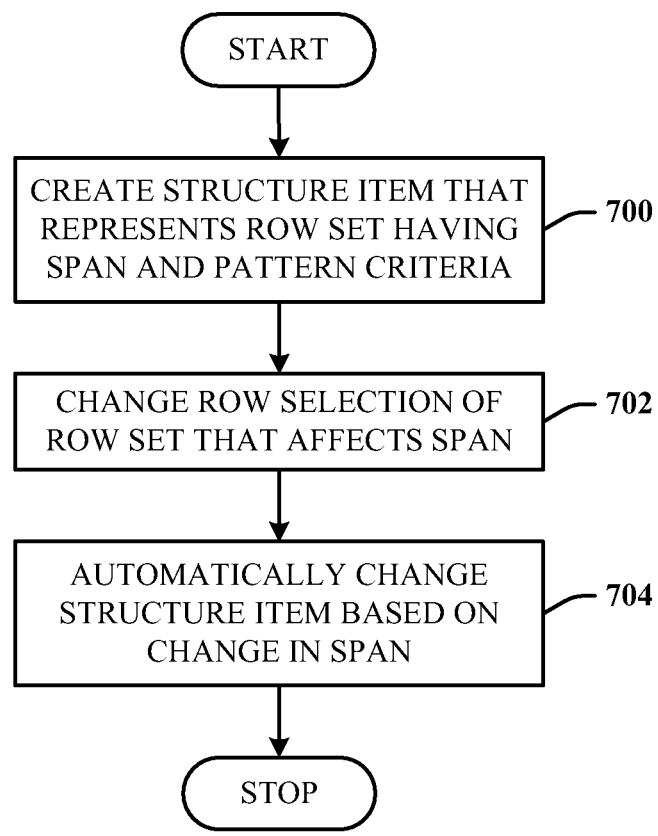
FIG. 7 illustrates a method of modifying a structure item based on a change in row selection that changes the span.

FIG. 7 illustrates a method of modifying a structure item based on a change in row selection that changes the span. At 700, a structure item is created that represents a row set having a span and a pattern criteria. At 702, the row selection is changed (e.g., by deselection of a row) that affects the span. At 704, the structure item is automatically changed based on the change in span. The structure then represents the change.

Figure 8:
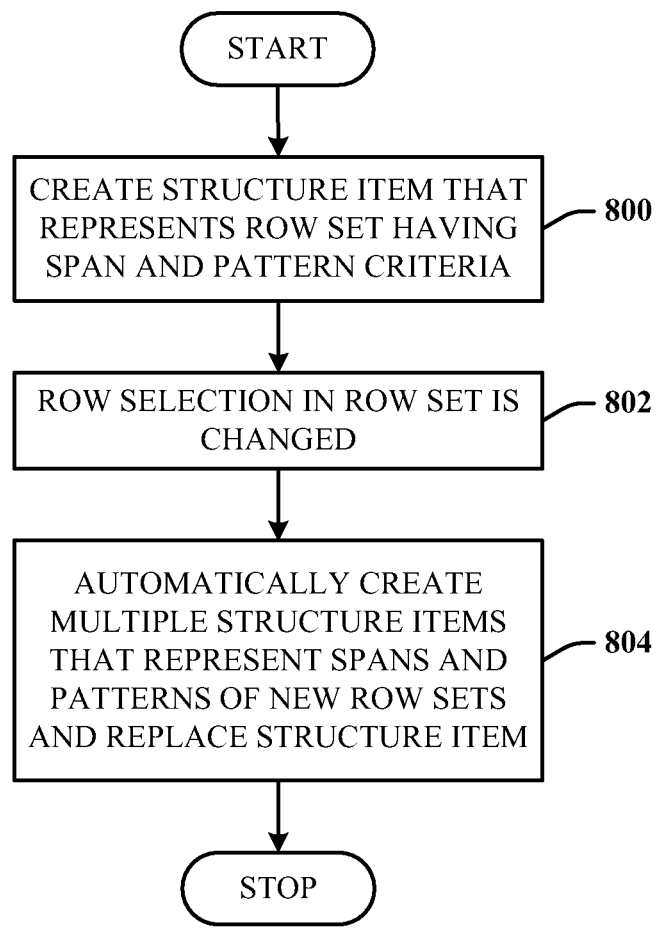
FIG. 8 illustrates a method of creating multiple structure items based on deselection of a row.

FIG. 8 illustrates a method of creating multiple structure items based on deselection of a row. At 800, a structure item is created that represents a row set having a span and pattern criteria. At 802, selection (or deselection) of a row of the row set is changed. At 804, multiple structure items that represent spans and pattern criteria of the new row sets are automatically created to replace the structure item.

Figure 9:
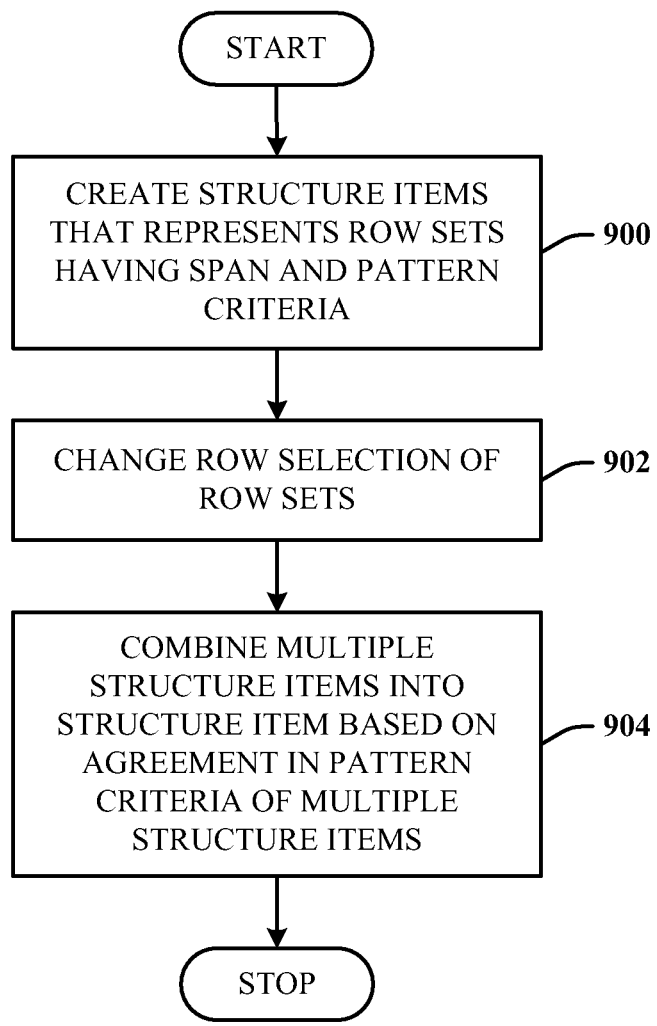
FIG. 9 illustrates a method of combining multiple structure items into a single structure item based on a change in row selection.

FIG. 9 illustrates a method of combining multiple structure items into a single structure item based on a change in row selection. At 900, structure items are created that represent row sets having span and pattern criteria. At 902, a change in row selection in the row sets is made. At 904, the multiple structure items are combined into the structure item based on agreement in the pattern criteria of the multiple structure items.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
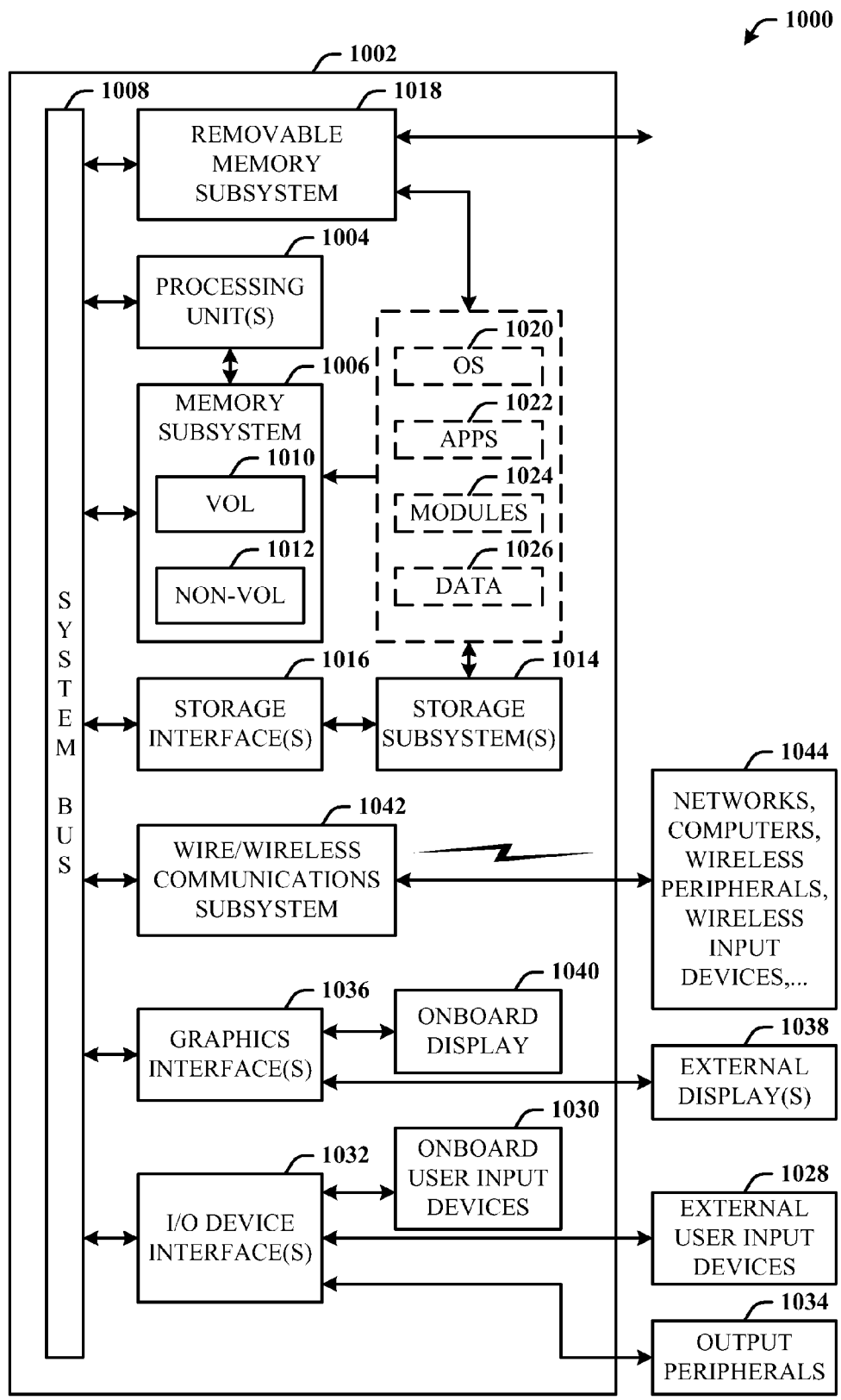
FIG. 10 illustrates a block diagram of a computing system operable to execute scalable selection management in accordance with the disclosed architecture.

Referring now to FIG. 10, there is illustrated a block diagram of a computing system 1000 operable to execute scalable selection management in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026. The one or more application programs 1022, other program modules 1024, and program data 1026 can include the system 100 of FIG. 1, the system 200 of FIG. 2, the system of FIG. 3, the representations of FIGS. 4-5, and the methods of 6-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wire/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wire/wireless communication subsystem 1042 (e.g., a network interface adapter, onboard transceiver subsystem, etc.) to communicate with wire/wireless networks, wire/wireless printers, wire/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented selection management system, comprising:
    memory for storing set structures representing selected data objects; and
    a processor for executing computer-executable components including:
        a selection component for listing rows of data objects returned as query results from a data source and creating a set of data objects based on a selection from the listing of data objects of rows of data objects selected by a user for presentation;
        a definition component for defining a set structure for the set of data objects, the set structure representing selected rows of data objects as a range of the selected rows of data objects and a pattern of the selected rows of data objects;
        a storage component for storing the set structure for the set of data objects in the memory, wherein memory usage to store the set structure for the set of data objects is proportional to a number of discontinuous ranges of the selected rows of data objects in the set structure, and wherein the selected data objects are not stored in the memory; and
        a composition component for changing composition of the set structure for the set of data objects in the memory as the user changes the selected rows of data objects.

2. The system of claim 1, wherein the composition component processes the set structure for the set of data objects in the memory against a new set structure and deletes the set structure for the set of data objects from the memory if the new set structure encapsulates the set structure for the set of data objects.

3. The system of claim 1, wherein the range is characterized by a starting index and an ending index over the selected rows of data objects.

4. The system of claim 1, wherein the pattern of the selected rows of data objects defines one of:
    selection of every row in the range of the selected rows of data objects,
    selection of every odd row in the range of the selected rows of data objects,
    selection of every even row in the range of the selected rows of data objects, and
    selection of every $n^{th}$ row in the range of the selected rows of data objects, where n is a positive integer greater than two.

5. The system of claim 1, wherein the storage component stores discontinuous ranges of the selected rows of data objects as a sorted list of ranges that is searchable according to a binary search method.

6. The system of claim 1, wherein the composition component merges discontinuous ranges of selected rows of data objects into a single continuous range of selected rows of data objects based on a selection of one or more new rows of data objects which makes the discontinuous ranges of selected rows of data objects continuous.

7. The system of claim 1, the composition component splits a continuous range of selected rows of data objects into multiple discontinuous ranges of selected rows of data objects based on deselection of one or more selected rows in the continuous range of selected rows of data objects.

8. The system of claim 1, wherein the definition component facilitates defining and storing new user-specified patterns based on searches performed by the user within the range of the selected rows of data objects.

9. The system of claim 1, wherein:
    the selection component creates multiple sets of data objects based on selection of discontinuous rows of data objects selected by the user for presentation;
    the definition component defines continuous row sets of selected rows as different set structures for the set of data objects that represent each continuous row set of selected rows according to span of each continuous row set and pattern of selected rows within each continuous row set; and the composition component changes composition of a set structure that represents a particular continuous row set of selected rows based on a change in the selected rows of the particular continuous row set.

10. The system of claim 9, wherein:

each different set structure for the set of data objects is characterized by a different span that includes a starting index and ending index of a corresponding continuous row set of selected rows, and each different set structure for the set of data objects is characterized by a different pattern of selected rows within a corresponding continuous row set of selected rows.

11. The system of claim 9, wherein the composition component merges multiple set structures that represent different continuous row sets into a single set structure based on a selection of one or more new rows which makes the different continuous row sets a single continuous row set.

12. The system of claim 9, wherein the composition component changes the composition of the set structure that represents the particular continuous row set by partitioning the set structure into multiple set structures based on deselection of one or more selected rows of the particular continuous row set.

13. The system of claim 9, wherein the different set structures are stored in the memory as a searchable list which is sorted based on the span of each corresponding continuous row set of selected rows.

14. A computer-implemented method of managing data selection, comprising:

presenting, on a computing device of user, a user interface listing rows of data objects returned as query results from a data source;

creating a set of data objects based on the user selecting rows of data objects from the listing for presentation;

defining a set structure for the set of data objects, the set structure representing selected rows of data objects as a range of the selected rows of data objects and a pattern of the selected rows of data objects;

storing the set structure for the set of data objects in memory, wherein memory usage to store the set structure for the set of data objects is proportional to a number of discontinuous ranges of the selected rows of data objects in the set structure, and wherein the selected data objects are not stored in the memory; and changing composition of the set structure for the set of data objects in the memory as the user changes the selected rows of data objects.

15. The method of claim 14, further comprising:

processing the set structure for the set of data objects in the memory against a new set structure; and deleting the set structure for the set of data objects from the memory if the new set structure encapsulates the set structure for the set of data objects.

16. The method of claim 14, further comprising automatically splitting a continuous range of selected rows of data objects into multiple discontinuous ranges of selected rows of data objects in response to the user deselecting one or more selected rows in the continuous range of selected rows.

17. The method of claim 14, further comprising combining multiple discontinuous ranges of selected rows of data objects into a single continuous range of selected rows of data objects based a selection of one or more new rows of data objects which makes the multiple discontinuous ranges of selected rows of data objects continuous.

18. The method of claim 14, wherein the pattern is a user-defined pattern based on a search performed by the user within the range of the selected rows of data objects.

19. The method of claim 14, further comprising storing discontinuous ranges of the selected rows of data objects as a searchable list which is sorted list based on a span of the selected rows within each discontinuous range of the selected rows.

* * * * *